United States Patent [19]

Dezelan

[11] 4,174,614
[45] Nov. 20, 1979

[54] TORQUE LIMITING CONTROL FOR FRONT WHEEL DRIVE

[75] Inventor: Joseph E. Dezelan, Western Springs, Ill.

[73] Assignee: Caterpillar Tractor Co., Peoria, Ill.

[21] Appl. No.: 874,080

[22] Filed: Feb. 1, 1978

[51] Int. Cl.² ............................................. F16H 39/46
[52] U.S. Cl. .................................... 60/445; 60/451; 60/484; 180/308
[58] Field of Search ............................... 60/420–422, 60/445, 451, 452, 484; 180/44 R, 44 M, 66 R, 66 B; 417/212

[56] References Cited

U.S. PATENT DOCUMENTS

| | | | |
|---|---|---|---|
| 3,543,508 | 12/1970 | Schwab | 60/445 X |
| 3,550,617 | 12/1970 | Johnson | 137/514.5 |
| 3,984,978 | 10/1976 | Alderson | 60/422 |
| 4,033,236 | 7/1977 | Johnson et al. | 91/463 |

Primary Examiner—Edgar W. Geoghegan
Attorney, Agent, or Firm—Wegner, Stellman, et al

[57] ABSTRACT

A vehicle drive system including a wheel adapted to at least partially propel a vehicle over underlying terrain and a hydraulic motor coupled to the wheel to drive the same. A flow and pressure compensated pump has an output for providing hydraulic fluid under pressure to the motor and includes a control system having an input for receiving a hydraulic signal and for controlling pressure and flow output characteristics of the pump. A manually settable, pressure reducing valve interconnects the pump output and the control system input to provide a substantially constant, but adjustable, pressure signal to the control system so that output pressure from the pump to the motor may be controlled independently of loading on the motor to set the maximum torque delivery of the motor at a desired value.

5 Claims, 1 Drawing Figure

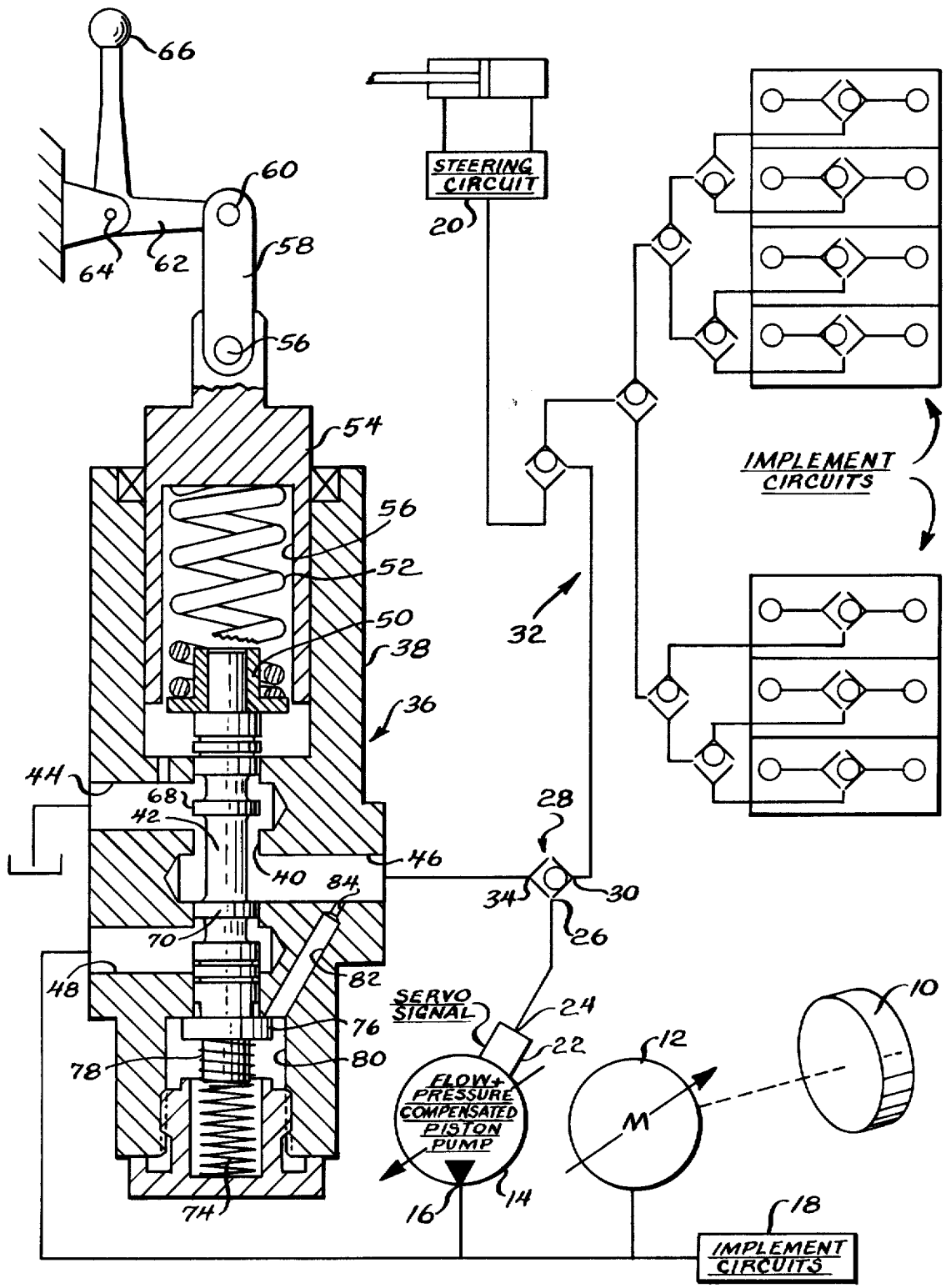

TORQUE LIMITING CONTROL FOR FRONT WHEEL DRIVE

BACKGROUND OF THE INVENTION

This invention relates to a vehicle drive system as, for example, a front wheel drive system embodying a hydraulic motor for a vehicle. It has been known to provide auxiliary, hydraulic front wheel drives in vehicles as, for example, motor graders. Typically, the hydraulic motors used to drive the front wheels of the vehicle have been supplied with hydraulic fluid under pressure from the pump source of the existing hydraulic system on the vehicle which typically will be a pressure compensated pump. Prior art indicative of this approach includes U.S. Pat. No. 3,984,978 issued Oct. 12, 1976 to Alderson.

Such systems, while operative for their intended purpose, have certain disadvantages. For example, they do not utilize a flow and pressure compensated pump which may be of considerable advantage in connection with other hydraulic circuits on the vehicle utilized for driving various implements. Secondly, if one of the hydraulically driven wheels loses traction and begins to spin, the flow control of the hydraulic motor will automatically operate to destroke the motor. This results in the motor driving the wheel at a higher and higher speed with a progressively decreasing torque until such time as the torque level becomes so low that the wheel again grips the underlying terrain. In the meantime, vehicle handling qualities are reduced due to the lack of traction and the spinning of the wheel.

When it has been attempted to utilize a flow and pressure compensated pump in such systems, the difficulty of loss of traction becomes even more pronounced. In the usual case, the drive provided to the front wheel is insufficient to propel the vehicle in and of itself and is employed principally to improve the performance of the vehicle. For example, when utilized in a motor grader, the small amount of drive provided by the front wheel will be sufficient to enable the grader to grade on a fairly steep side slope without the front of the vehicle tending to slide downhill. It is also helpful in assuring good handling of the vehicle when operating in mud or snow.

In any event, because the hydraulic motors propelling the front wheels cannot propel the vehicles in and of themselves, their typical load and pressure compensating system continually sense that the motor is overloaded under normal traction conditions. That is, because the motors are lugging, they will not take the full hydraulic flow they could demand.

Consequently, the typical load signal from such motor elevates and, when directed to a flow and pressure compensated pump, the pump increases its pressure. As long as normal traction prevails, the pump output pressure spirals upwardly until maximum pressure is obtained.

At some point in the cycle, traction may be lost and the wheels will begin to spin. The hydraulic motor driving the wheel, through its flow and pressure compensating control strokes back thereby causing its speed to increase and torque to decrease until the torque becomes so low that the wheel reestablishes normal traction. The cycle will then tend to repeat itself.

As a consequence, as far as is known, it has been impossible to unite flow and pressure compensated pumps with hydraulic vehicle drive systems.

SUMMARY OF THE INVENTION

The present invention is directed to overcoming one or more of the above problems.

According to the present invention, there is provided a vehicle drive system comprising ground engaging wheels adapted to at least partially propel a vehicle over the underlying terrain. A hydraulic motor is coupled to the ground engaging means to drive the same. A flow and pressure compensated pump has an output for providing hydraulic fluid under pressure to the motor and includes a control system having an input for receiving a hydraulic signal and for controlling pressure and flow output characteristics of the pump. The invention provides a manually settable means connected to the control system inlet providing a substantially constant, but adjustable, pressure signal to the control system to adjustably limit the maximum torque applied to the ground engaging means.

Other objects and advantages will become apparent from the following specifications taken in connection with the accompanying drawings.

DESCRIPTION OF THE DRAWINGS

The FIGURE is a partially schematic, partially sectional view of a vehicle drive system made according to the invention.

DESCRIPTION OF THE PREFERRED EMBODIMENT

An exemplary embodiment of a vehicle drive system made according to the invention is illustrated in the FIGURE and is seen to include a ground engaging means in the form of a wheel 10 driven by a flow and pressure compensated hydraulic motor 12. While the drawing illustrates the presence of but a single wheel 10 and associated motor 12, in the usual case, there will be a plurality of the wheels 10 and an equal number of associated motors 12 or, in the alternative, a plurality of the wheels 10 and a single one of the motors 12 driving the plurality of wheels through a differential or the like.

The motor 12 receives hydraulic fluid under pressure from a flow and pressure compensated hydraulic pump 14 having an outlet 16 which is connected to the motor 12 and to a plurality of implement circuits, shown schematically at 18. When the invention is employed in, for example, a motor grader, the implement circuits will include a blade circuit for raising and lowering the blade, a swing circuit for rotating the blade, wheel tilt circuits for tilting the front wheels, etc.

The vehicle will also include a steering circuit 20. The pump 14 includes a conventional control system 22 having an inlet 24 for receiving a hydraulic control signal to adjust the pressure and flow characteristics at the output port 16 of the pump 14 in the conventional fashion. The input 24 is connected to the output 26 of a conventional resolver, generally designated 28. One input 30 to the resolver 28 is received from a conventional resolver circuit, generally designated 32, which is operative to provide to the input 30, the highest pressure signal occurring at any given time in any of the implement circuits or in the steering circuit 20.

The other input 34 of the resolver 28 is connected to a valve, generally designated at 36, to be described. In any event, those skilled in the art will appreciate that the resolver 28 will apply the highest pressure signal received at either input 30 or 34 to the control system 22 for the pump 14.

The valve 36 includes a body 38 having a bore 40 which slidably receives a spool 42. The body 38 includes axially spaced ports 44, 46 and 48 opening to the bore 40 with the port 46 serving as a signal port which is connected to the input 34 of the resolver 28. The port 44 is connected to the tank as illustrated while the port 48 is connected to the output 16 of the pump 14.

One end of the spool 42 mounts a collar 50 and a spring 52 is abutted against the collar 50. A plunger 54 having an interior bore 56 which houses the spring 52 is mounted for reciprocation within the body 38 and those skilled in the art will appreciate that by varying the position of the plunger 54, the degree of the pressure on the spring 52 can be selectively altered to adjust the biasing force applied by the spring 52 to the spool 42.

The plunger 54 is connected via a pivot 56 to a link 58 which in turn is pivoted at 60 to a bellcrank 62. The bell crank 62 will typically be mounted in the operator area of the vehicle by means of a pivot 64 and is provided with a handle 66. Conventional detent means (not shown) are provided for holding the bellcrank 62 in any position of pivotal movement about the pivot point 64. As a consequence, the handle 66 may be manipulated to alter the position of the plunger 54 within the body 38 and suitably adjust the degree of bias provided to the spool 42 by the spring 52 and maintain such positioning of the plunger 54.

The spool 42 includes a first land 68 which may be shifted upon spool movement to block fluid communication between the ports 44 and 46. An additional land 70 is operative to control fluid communication between the ports 48 and 46.

In bucking relation to the spring 52, and within the body 38 is a spring 74 which acts against the opposite end of the spool 42.

More specifically, the spring 74 acts against a shoulder 76 on the end 78 of the spool. The shoulder 76 and the end 78 are within a chamber 80 within the body 38 which chamber 80 is connected by a flow passage 82 and a restricted flow orifice 84 to the signal port 46. As a consequence, fluid under pressure in the signal port 46 will be conveyed to the end 78 of the spool 42 to act thereagainst to provide a biasing force that acts in concert with that provided by the spring 74. The orifice 84 serves to restrict fluid flow through the passage 82 to dampen oscillating movement of the spool 42 in response to changes in pressurization at the end 78.

The valve 36 acts, in effect, as a pressure reducing valve, reducing the pressure at the port 46 to some lesser pressure, depending upon the position of the plunger 54, and applying the reduced pressure to the control system 22 for the pump 14 to thereby limit the maximum pressure at the output 16. This, in turn, limits the maximum pressure available to the motor 12 and thus provides a limit on the torque delivery therefrom to the wheel 10.

In operation, The operator of the vehicle will select a setting for the valve 36 by appropriate manipulation of the handle 66. This will be accomplished by moving the bellcrank 62 in a clockwise direction, as seen in the FIGURE, to move the plunger 54 more deeply into the body 38, thereby compressing the spring 52. As a consequence of this action, the spool 42 will be moved downwardly against the bias of the spring 74 and at some point in time, the land 68 will halt fluid communication between the port 46 and the reservoir connected port 44. At the same time, the land 70 will enable flow of fluid from the output 16 of the pump to the signal port 46 to provide a control signal to the control system 22. As the pressure at the port 46 begins to elevate, the pressure responsive surface on the spool 42 defined by the end 78 will be pressurized to cause the spool 42 to move upwardly as seen in the drawing such that the land 70 will begin to meter flow from the port 48 to the port 46. A balancing action will be struck so that a constant pressure signal, determined by the positioning of the bell crank 62 by the operator, will be applied to the control system 22 for the pump 14. Consequently, the characteristics of the hydraulic fluid at the output 16 of the pump 14 will be controlled totally independently of the load sensed by the motor 12.

In the usual case, the operator will select a setting of the valve 38 that will provide a torque at the wheel 10 just slightly less than that required for it to lose traction. The actual setting will depend upon the environment in which the vehicle is operated. For example, a lower level of maximum torque will be selected when the vehicle is operating in snow or mud than when the vehicle is operating on dry earth.

In the event implement circuits demand a greater pressure and/or flow than that provided by the pump 14 when under control of the valve 36, the resolver 28 will act to apply the high pressure signal from the particular implement circuit or circuits to the control system 22 which will then cause the pump 14 to adjust its output accordingly. This, in turn, will result in an increase in the maximum torque output of the motor 12 but as is well known by those skilled in the art, the operation of the implement circuits will be intermittent and therefore such operation in response to implement loading does not effect to any significant degree the ability of the system to employ the main vehicle pump, which may then be a flow and pressure compensated pump, as the source of fluid under pressure for the front wheel drive of a motor grader or the like while avoiding loss of traction present in prior art constructions.

The embodiments of the invention in which an exclusive property or privilege is claimed are defined as follows:

1. A vehicle drive system comprising:
   ground engaging means adapted to at least partially propel a vehicle over underlying terrain;
   a hydraulic motor coupled to said ground engaging means to drive the same;
   a flow and pressure compensated pump having an output for providing hydraulic fluid under pressure to said motor and including a control system having an input for receiving a hydraulic signal and for controlling pressure and flow output characteristics of the pump; and
   a manually settable pressure reducing valve interconnecting said output and said input to provide a substantially constant, but adjustable, pressure signal to said control system,
   whereby output pressure from said pump to said motor may be controlled independently of loading on said motor to set maximum torque delivery of said motor at a desired value.

2. The vehicle drive system of claim 1 wherein said valve includes an inlet port connected to said output, a signal port connected to said inlet, a shiftable metering element for controlling fluid flow between said ports, a manually operable adjustable biasing means for a desired biasing force to said element, and a pressure responsive surface on said element in bucking relation to said biasing means and in fluid communication with said signal port.

3. The vehicle drive system of claim 2 wherein said metering element is a spool and further including additional biasing means in bucking relation to said adjustable biasing means.

4. A hydraulic system for a vehicle including the vehicle drive system of claim 1 and further including at least one implement circuit connected to said output; hydraulic load sensing means for said implement circuit; and a resolver connected to said inlet, said valve and said load sensing means.

5. A vehicle drive system comprising:
- ground engaging means adapted to at least partially propel a vehicle over underlying terrain;
- a hydraulic motor coupled to said ground engaging means to drive the same;
- a flow and pressure compensated pump having an output for providing hydraulic fluid under pressure to said motor and including a control system having an input for receiving a pressure signal and for controlling pressure and flow output characteristics of the pump; and
- a manually settable means connected to said input for providing a substantially constant, but adjustable, pressure signal which is independant of the speed of said pump to said control system to adjustably limit the maximum torque applied to said ground engaging means.

* * * * *